May 14, 1957 JEAN-PAUL GAMACHE Re. 24,316

THREAD CUTTING AND INSPECTION MACHINE

Original Filed Oct. 18, 1954 2 Sheets-Sheet 1

Inventor:
Jean Paul Gamache
By
Attorney

THREAD CUTTING AND INSPECTION MACHINE
Original Filed Oct. 18, 1954 2 Sheets-Sheet 2
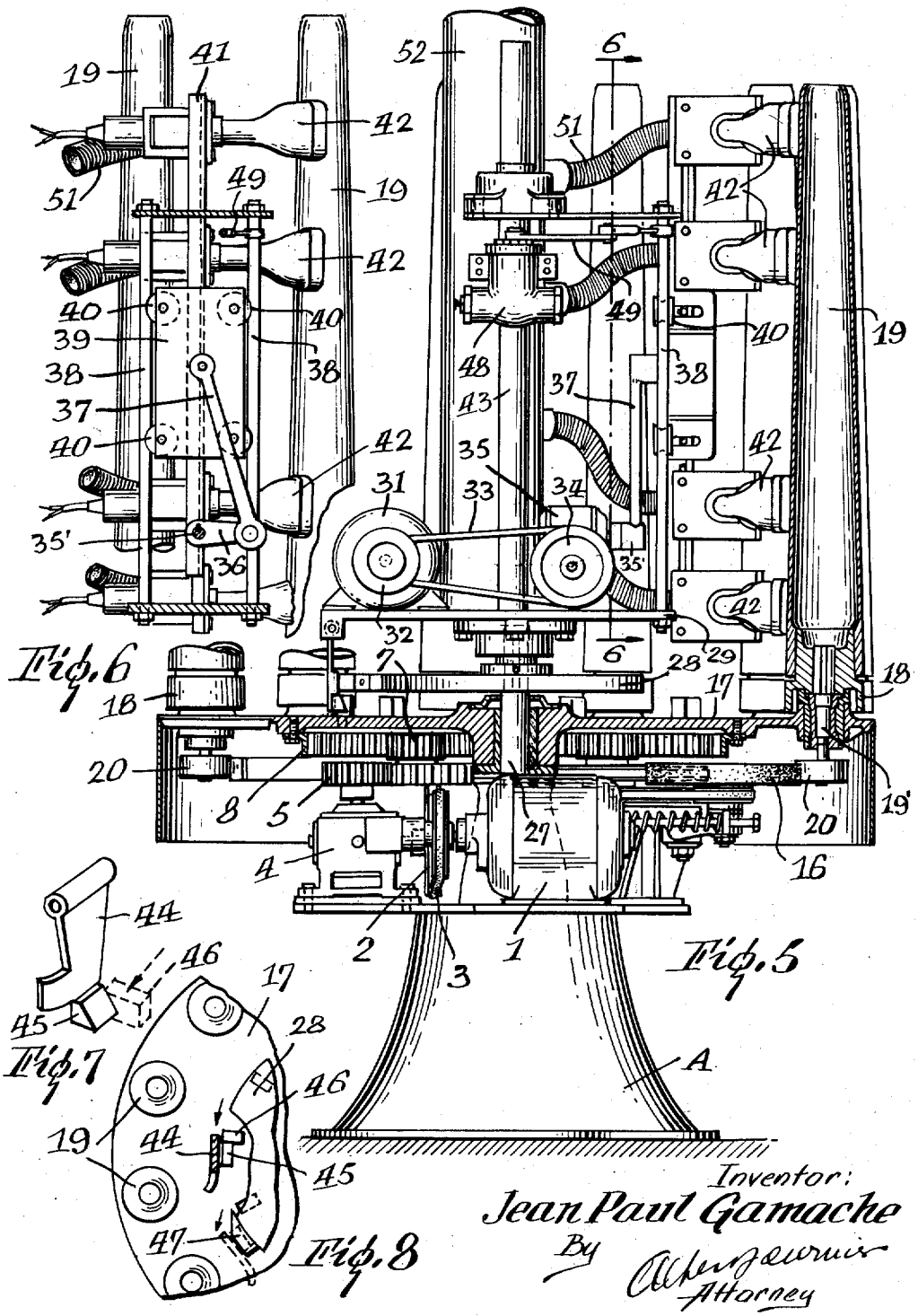

United States Patent Office

Re. 24,316
Reissued May 14, 1957

24,316

THREAD CUTTING AND INSPECTION MACHINE

Jean-Paul Gamache, Plessisville, Quebec, Canada, assignor to Tricot Somerset Inc., Plessisville, Quebec, Canada Original No. 2,705,827, dated April 12, 1955, Serial No. 462,984, October 18, 1954. Application for reissue December 26, 1956, Serial No. 630,718

21 Claims. (Cl. 26—7)

Matter enclosed in heavy brackets [ ] appears in the original patent but forms no part of this reissue specification; matter printed in italics indicates the additions made by reissue.

The present invention pertains to a novel machine for cutting thread ends from stockings and for providing an inspection station or interval.

The principal object of the invention is to provide such a machine that is fully automatic in operation. More particularly, a number of forms are mounted for individual rotation while revolving with a rotary table. The forms come successively into engagement with a device that rotates them for an interval of time. During this interval the forms are engaged by a reciprocating series of thread clippers and are next disengaged by the clippers. After this interval, the forms engage a friction plate that rotates them slowly for inspection.

In the accomplishment of these objects, a gear train drives the rotary table and also the device that intermittently rotates the forms. Through a self-disengaging *arrangement of block elements which serve as a* clutch, the table drives a platform that carries the clippers. On disengagement, a return device reverses the rotation of the platform to bring it back to its initial position.

On the platform, the clippers are carried by a slide that moves them along the rotating forms. A separate drive is provided for reciprocating the slide.

Figure 1:
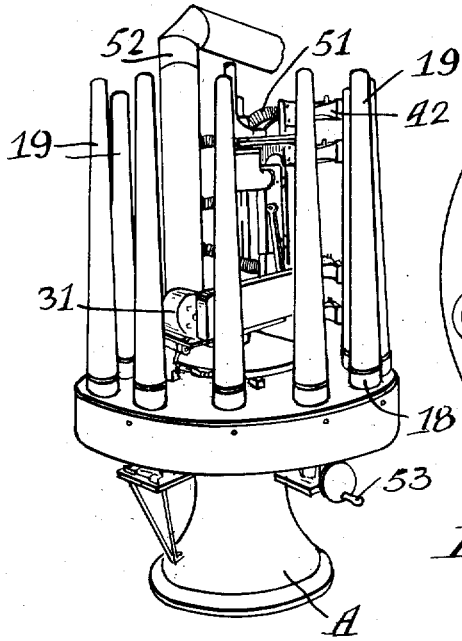
Figure 2:
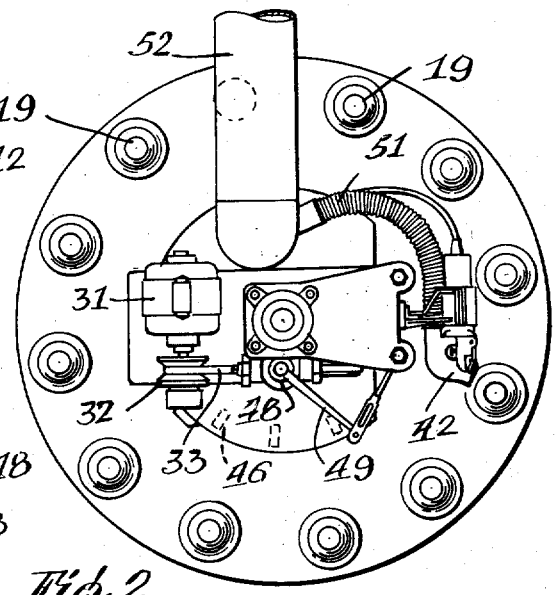
Figure 3:
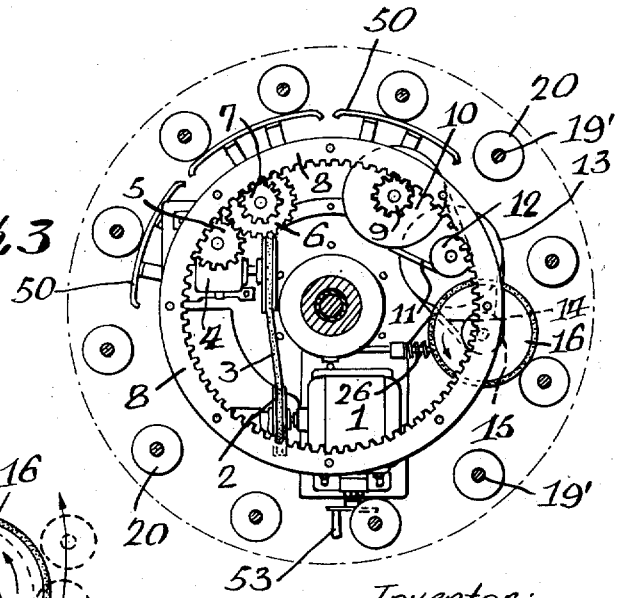
Figure 4:
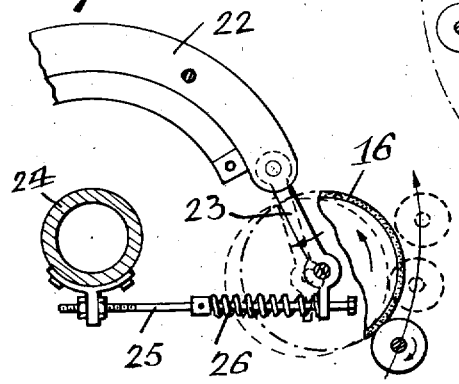

The invention is fully disclosed by way of example in the following description and in the accompanying drawings in which:

Figure 1 is a perspective view of the machine;
Figure 2 is a plan view;
Figure 3 is a plan section;
Figure 4 is a detail plan section;
Figure 5 is a vertical elevation partly in section;
Figure 6 is a detail vertical section on the line 6—6 of Figure 5;
Figure 7 is a detail perspective view; and
Figure 8 is a detail plan section.

Reference to these views will now be made by use of like characters which are employed to designate corresponding parts throughout.

In Figure 5 is shown a base structure A on which is mounted a motor 1 driving a variable speed pulley 2. Through a belt 3 (Figure 3) the pulley drives a reducer 4 which in turn drives a gear 5. The latter meshes with a gear 6 co-axial with a pinion 7 which in turn meshes with an internal or ring gear 8 supported as will presently be described.

The ring gear 8 drives a pinion 9 carrying a pulley 10 joined by a belt 11 to a smaller pulley 12 carrying a larger pulley 13. A belt 14 connects pulley 13 to a smaller pulley 15 which is co-axial with a friction disk 16.

The ring gear 8 is bolted beneath a table 17 which is rotatably supported on an extension of the base A. Holders 18 are mounted in a circular series on the table 17 and receive tubular forms 19 set therein. Shafts 19' on the lower ends of the forms carry disks 20 adapted to engage the wheel 16 successively. The forms revolve with table 17, and are rotated on their axes as the disks 20 engage the wheel 16.

A fixed support 22 carries a pivoted arm 23 which in turn mounts the wheel 16 as shown in Figure 4. A fixed post 24 carries an adjustable rod 25 on which is mounted a coil spring 26 bearing against the arm 23. The friction wheel 16 is thus held yieldably against the disks 20.

Stockings are mounted on the forms 19 with the rough surfaces exposed. The forms turn rapidly in order to be engaged by clippers *or cutting means* as will now be described.

On the trunnion 27 extending from the base A and carrying the table 17 is mounted a fixed plate 28 and an oscillating platform 29. Thereon is mounted a motor 31 having a pulley 32 joined by a belt 33 to the pulley 34 of a reducer 35. The shaft [35] *35'* of the reducer carries a crank 36 to which is pivoted a link 37 (Figure 6). Vertical guides 38 on the platform 29 accommodate a slide plate 39 having rollers 40 engaging the guides. Plate 39 carries another plate 41 which supports *cutting means in the form of* four clippers 42 in vertical alinement.

From the platform 29 is suspended a lever 44 (Figures 7 and 8) having a foot 45 adapted to be engaged by one of a series of blocks 46 on the table 17. The platform 29 is thus driven by table 17.

On fixed plate 28 is a cam 47 which, when engaged by lever 44, pushes the lever outward and breaks the driving engagement, *thus lever 44, foot 45 and cam 47 constitutes a self-disengaging clutch.* The platform 29 is then returned or given a reverse turn by a door [check] *closer* device 48 having an operating lever 49 connected to one of the guide rails 38, as shown in Figures 5 and 6. Said door [check] *closer device* 48 is fixed to a shaft 43 *that reaches vertically from the trunnion 27.*

After the disks 20 leave the friction wheel 16, they roll slowly along friction plates 50 (Figure 3) to permit careful inspection *of the stockings on the forms* by an operator *after which the stockings may be removed from the forms.* Between the last plate 50 and the wheel 16, another operator mounts stockings on the forms *after the clipped stockings have been removed therefrom.*

It is evident from Figure 8 that the platform 29 is driven about 30°, whereby the clippers 42 remain in engagement with each form for 30° of form revolution, while the form rotates rapidly as set forth. The clippers reciprocate vertically on the stockings by the described crank and slide mechanism. The clippings are drawn through tubes 51 to a vertical suction exhaust pipe 52. A crank 53 (Figure 1) is provided for changing the speed of round table 17 if desired or necessary.

*As the stockings for which this machine is designed have numerous projecting threads and the clipping or cutting of the threads should not be made too close to the knitted fabric, the cutting blade or means must be suitably spaced from the stocking fabric upon engagement of the form and the cutting means. Therefore, for the purposes of this specification the terms "engage" or "engagement" are intended to mean that the cutting blade or means is in close proximity to, adjacent to or in spaced relation to the fabric, that is, the blade that performs the cutting operation is sufficiently close to the knitted fabric to cut projecting threads but sufficiently spaced from the fabric to avoid cutting the stocking during the cutting of the threads.*

Although a specific embodiment of the invention has been illustrated and described, it will be understood that various alterations in the details of construction may be made without departing from the scope of the invention as indicated by the appended claims.

What I claim is:

1. A thread cutting and inspection machine comprising a base, a rotary table thereon, a plurality of forms rotatably mounted thereon, means for rotating said forms individually during their revolution with said table, a rotatably mounted platform, clippers mounted for vertical reciprocation on said platform and adapted to engage said forms, and means for reciprocating said clippers.

2. A thread cutting and inspection machine comprising a base, a rotary table thereon, a plurality of forms rotatably mounted thereon, means for rotating said forms individually during their revolution with said table, a rotatably mounted platform, clippers mounted for vertical reciprocation on said platform and adapted to engage said forms, and means for reciprocating said clippers, and means for oscillating said platform about the axis of said table.

3. A thread cutting and inspection machine comprising a base, a rotary table thereon, a plurality of forms rotatably mounted thereon, means for rotating said forms individually during their revolution with said table, a rotatably mounted platform, clippers mounted for vertical reciprocation on said platform and adapted to engage said forms, and means for reciprocating said clippers, a disk on each form, and a friction plate spaced from the first means and engageable by said disks for rotating said forms for inspection.

4. A thread cutting and inspection machine comprising a base, a rotary table thereon, a plurality of forms rotatably mounted thereon, means for rotating said forms individually during their revolution with said table, a rotatably mounted platform, clippers mounted for vertical reciprocation on said platform and adapted to engage said forms, and means for reciprocating said clippers, means for oscillating said platform about the axis of said table, a disk on each form, and a friction plate spaced from the first means and engageable by said disks for rotating said forms for inspection.

5. A thread cutting and inspection machine comprising a base, a rotary table thereon, a plurality of forms rotatably mounted thereon, a disk on each form, a rotary friction wheel engageable by said disks to rotate the forms individually during their revolution with said table, a rotatably mounted platform, clippers mounted for vertical reciprocation on said platform and adapted to engage said forms, and means for reciprocating said clippers.

6. A thread cutting and inspection machine comprising a base, a rotary table thereon, a plurality of forms rotatably mounted thereon, means for rotating said forms individually during their revolution with said table, a rotatably mounted platform, clippers mounted for vertical reciprocation on said platform, and adapted to engage said forms, and means for reciprocating said clippers, a clutch between said table and platform for driving the latter, means for periodically disengaging said clutch, and means for returning said platform in the reverse direction.

7. A thread cutting and inspection machine comprising a base, a rotary table thereon, a plurality of forms rotatably mounted thereon, a disk on each form, a rotary friction wheel engageable by said disks to rotate the forms individually during their revolution with said able, a rotatably mounted platform, clippers mounted for vertical reciprocation on said platform and adapted to engage said forms, means for reciprocating said clippers, and a friction plate spaced from the first means and engageable by said disks for rotating said forms for inspection.

8. A thread cutting and inspection machine comprising a base, a rotary table thereon, a plurality of forms rotatably mounted thereon, a disk on each form, a rotary friction wheel engageable by said disks to rotate the forms individually during their revolution with said table, a rotatably mounted platform, clippers mounted for vertical reciprocation on said platform and adapted to engage said forms, means for reciprocating said clippers, a clutch between said table and platform for driving the latter, means for periodically disengaging said clutch, and means for returning said platform in the reverse direction.

9. A thread cutting and inspection machine comprising a base, a rotary table thereon, a plurality of forms rotatably mounted thereon, a disk on each form, a rotary friction wheel engageable by said disks to rotate the forms individually during their revolution with said table, a rotatably mounted platform, clippers mounted for vertical reciprocation on said platform and adapted to engage said forms, means for reciprocating said clippers, a clutch between said table and platform for driving the latter, means for periodically disengaging said clutch, and means for returning said platform in the reverse direction, and a friction plate spaced from the first means and engageable by said disks for rotating said forms for inspection.

10. A thread cutting and inspection machine comprising a base, a rotary table thereon, a plurality of forms rotatably mounted thereon, means for rotating said forms individually during their revolution with said table, a rotatably mounted platform, a slide on said platform, means for reciprocating said slide vertically, and clippers carried by said slide and adapted to engage said forms.

*11. A thread cutting and inspection machine comprising a base, a plurality of individual rotatable tubular forms, means on said base for vertically supporting and conveying said rotatable forms in a prescribed path of travel, and thread clipping means mounted in juxtaposition to the path of travel of said forms and adapted to engage said forms.*

*12. A thread cutting and inspection machine comprising a plurality of individual rotatable forms, means for supporting and conveying said rotatable forms in a prescribed path of travel, a thread clipping means mounted in juxtaposition to the path of travel of said forms, and means for rotating said forms individually during presentation to the thread clipping means.*

*13. A thread cutting and inspection machine comprising a base, a plurality of hosiery receiving forms, means on said base for rotatably supporting and conveying said forms along a path, cutting means mounted from said base to engage each of said forms individually in the path of form travel, means for revolving each of said forms during contact by the cutting means, and suction means for collecting clippings from said cutting means.*

*14. A thread cutting and inspection machine comprising a plurality of forms, means for supporting said forms for individual rotation about a vertical axis, means for moving said supporting means in a directed path of travel, thread clipping means mounted in juxtaposition to the path of form travel to engage each of said forms, means for rotating each of said forms individually upon presentation to the thread clipping means, and suction means for collecting clippings from said clipping means.*

*15. A thread cutting and inspection machine comprising a base, a plurality of forms, a form conveying table mounted on said base for rotatably supporting and presenting said forms in a directed line of travel, thread cutting means mounted in the line of travel of said forms to engage each of said forms, said thread cutting means having a suction exhaust means to draw cut threads therein, and means for rotating each of said forms individually during engagement with the thread cutting means.*

*16. A thread cutting and inspection machine comprising a base, a form conveying means on said base, a plurality of forms mounted for rotation about a vertical axis on said form conveying means, thread cutting means supported in spaced relation to the path of travel of said forms for engaging each of said forms presented by said form conveying means, means for rotating each of said forms individually during presentation of the forms to*

*the thread cutting means, and suction means associated with said thread cutting means to collect cut threads.*

*17. A thread cutting and inspecting machine comprising a base, a rotary table mounted on said base, a plurality of forms mounted for rotation about a vertical axis of the form on the table, means for rotating said forms individually during their revolution with said table, a rotatably mounted platform supported above said table, and cutting means mounted on said platform and adapted to engage said forms, and means for oscillating said platform and said cutting means upon engagement and disengagement of the cutting means and each form.*

*18. A thread cutting and inspection machine comprising a base, a hosiery supporting form, means for supporting said form from said base and conveying said form along a directed path of travel, said form being freely rotatable about a vertical axis on said supporting means, means for driving said supporting means, thread clipping means in the path of form travel for engaging the form, and means for rotating said rotatable form at a selected position for thread clipping by the thread clipping means.*

*19. A thread cutting and inspection machine comprising a base, a plurality of stocking receiving forms, means on said base for rotatably supporting and conveying said forms along a directed path of travel, thread clipping means supported from the base, said thread clipping means being mounted in spaced relation to and in the path of travel of said forms, and means for revolving each of said forms individually upon presentation of a form to the thread clipping means.*

*20. A thread cutting and inspection machine comprising a base, a plurality of stocking receiving forms, a form conveying means mounted on the base for rotatably supporting each of the forms about a form vertical axis and advancing the forms in a directed line of travel in spaced relation to each other, thread cutting means mounted adjacent to the line of travel of said forms, means for rotating each of said forms individually about the vertical axis of the forms at one end thereof upon presentation of a form to the thread cutting means, and suction exhaust means mounted adjacent the cutting means for collecting cut threads therein.*

*21. A thread cutting and inspection machine comprising a base, a plurality of tubular stocking receiving forms, means on said base for retaining each of said forms for rotation about a vertical axis and conveying said forms along a path of travel, one end of each said form being free to receive thereon a stocking, thread clipping means mounted in juxtaposition to said path of travel of said forms, and means for revolving each of said forms adjacent to said cutting means.*

References Cited in the file of this patent or the original patent

UNITED STATES PATENTS

| | | |
|---|---|---|
| 1,859,094 | Katzenmoyer | May 17, 1932 |
| 2,233,451 | Huffman et al. | Mar. 4, 1941 |
| 2,613,425 | Whitaker | Oct. 14, 1952 |